(12) United States Patent
Gueller et al.

(10) Patent No.: US 10,265,701 B2
(45) Date of Patent: Apr. 23, 2019

(54) SUBSTANCE CONTAINER

(71) Applicant: Chemspeed Technologies AG, Fullinsdorf (CH)

(72) Inventors: Rolf Gueller, Herznach (CH); Michael Schneider, Frick (CH); Thomas Thaler, Laufen (CH); Markus Schindler, Ennetburgen (CH)

(73) Assignee: Chemspeed Technologies AG, Fullinsdorf (CH)

( * ) Notice: Subject to any disclaimer, the term of this patent is extended or adjusted under 35 U.S.C. 154(b) by 174 days.

(21) Appl. No.: 15/525,444

(22) PCT Filed: Nov. 9, 2015

(86) PCT No.: PCT/CH2015/000166
§ 371 (c)(1),
(2) Date: May 9, 2017

(87) PCT Pub. No.: WO2016/074106
PCT Pub. Date: May 19, 2016

(65) Prior Publication Data
US 2018/0111127 A1    Apr. 26, 2018

(30) Foreign Application Priority Data

Nov. 10, 2014    (CH) ...................................... 1738/14

(51) Int. Cl.
*B01L 3/00* (2006.01)
*B65D 13/02* (2006.01)
(Continued)

(52) U.S. Cl.
CPC ................. *B01L 3/523* (2013.01); *B01L 3/02* (2013.01); *B65D 13/02* (2013.01); *B65D 47/10* (2013.01);
(Continued)

(58) Field of Classification Search
CPC .... B01J 2219/00306; B01L 2200/0605; B01L 2200/18; B01L 2300/046;
(Continued)

(56) References Cited

U.S. PATENT DOCUMENTS 5,052,588 A    10/1991   Schlosser
5,190,880 A     3/1993   Cassou et al.
(Continued)

FOREIGN PATENT DOCUMENTS

CN        102776118 A    11/2012
KR     1020060005535 A     1/2006
(Continued)

*Primary Examiner* — Jennifer Wecker
(74) *Attorney, Agent, or Firm* — The Webb Law Firm

(57) ABSTRACT

A container for taking up and dispensing a substance includes a glass tubule, a glass punch that slides adjustably in the glass tubule, forming a seal, and a glass sleeve closed on one side, in which the glass tubule is accommodated. The glass sleeve is shorter than the glass tubule, so that the glass tubule projects out of the glass sleeve. The glass punch is longer than the glass tubule and projects out of the glass tubule at the end situated outside of the glass sleeve. The glass punch does not fill the glass tubule completely, so that a substance chamber remains in the region of the end of the glass tubule situated within the glass sleeve.

21 Claims, 3 Drawing Sheets

(51) Int. Cl.
    *B65D 47/10*     (2006.01)
    *B01L 3/02*      (2006.01)
(52) U.S. Cl.
    CPC .... *B01J 2219/00306* (2013.01); *B01L 3/0289* (2013.01); *B01L 2200/0605* (2013.01); *B01L 2200/18* (2013.01); *B01L 2300/046* (2013.01); *B01L 2300/0672* (2013.01); *B01L 2300/0832* (2013.01); *B01L 2300/0838* (2013.01); *B01L 2400/0406* (2013.01); *B01L 2400/0478* (2013.01)
(58) Field of Classification Search
    CPC ..... B01L 2300/0672; B01L 2300/0832; B01L 2300/0838; B01L 2400/0406; B01L 2400/0478; B01L 3/02; B01L 3/0289; B01L 3/523; B65D 13/02; B65D 47/10
    See application file for complete search history.

(56) References Cited

U.S. PATENT DOCUMENTS

| | | | |
|---|---|---|---|
| 2004/0122359 A1* | 6/2004 | Wenz | A61M 5/31511 |
| | | | 604/82 |
| 2008/0233633 A1 | 9/2008 | Clairaz et al. | |
| 2014/0273202 A1* | 9/2014 | Saito | B01L 3/502784 |
| | | | 435/304.1 |

FOREIGN PATENT DOCUMENTS

| | | |
|---|---|---|
| WO | 03089029 A1 | 10/2003 |
| WO | 2005065966 A1 | 7/2005 |

\* cited by examiner

SUBSTANCE CONTAINER

CROSS-REFERENCE TO RELATED APPLICATIONS

This application is the United States national phase of International Application No. PCT/CH2015/000166 filed Nov. 9, 2015, and claims priority to Swiss Patent Application No. 1738/14 filed Nov. 10, 2014, the disclosures of which are hereby incorporated in their entirety by reference.

BACKGROUND OF THE INVENTION

Field of the Invention

The invention relates to a container for a substance, a kit for producing such a container, as well as to a method for filling and a method for emptying such a container.

Description of Related Art

A substance library or compound library is the core of any chemical company, particularly in the pharmaceutical industry. Many compounds, often reflecting decades of synthesis activity, are filed in such a library and form a source for many screening activities. The stored substances or compounds are often very valuable, difficult to synthesize, expensive to buy or to extract, and often the substances are only present in very small amounts worldwide.

Pharmaceutical companies often have a million and more substances on hand in their substance libraries and use their own substance management groups to administer them, which groups have the task of making required substance samples available from the library, often in tiny amounts all the way down into the sub-milligram range, for example for special biological tests. In this regard, the required substance amount, which is often very small, must be removed from the storage container of the library, which often contains very little substance, and filled into a transport vessel (called 1:1 filling). In this regard, the substances to be filled or metered can have very different consistencies, which require the use of specific filling tools, in each instance. Depending on the consistency or the physical properties of the substance to be filled into a container, filling can only take place manually, and therefore relatively great time expenditure and/or personnel effort is required, particularly at larger companies.

By means of the present invention, a substance container is now supposed to be made available, with which the sequences described above for 1:1 filling can be clearly simplified. In more concrete terms, a substance container that is easy to produce and therefore cost-advantageous is supposed to be created, which is universally suitable for substances of practically any consistency and is specifically tailored for taking up the smallest possible substance amounts, down into the milligram and sub-milligram range. Furthermore, the substance container is supposed to guarantee optimal protection of the substance accommodated in it with regard to external influences, and, at the same time, also to be suitable as a storage container or transport container.

SUMMARY OF THE INVENTION

With regard to the substance container, the essence of the invention consists of the following: A container for taking up and dispensing a substance comprises a tubule, a punch disposed in the tubule so as to slide adjustably, forming a seal, and a sleeve closed on one side, in which the tubule is accommodated. The punch projects out of one end of the tubule and does not fill the tubule completely, so that a substance chamber remains in the region of the end of the tubule situated within the sleeve, which chamber has a holding volume that is adaptable by means of adjusting the punch.

With regard to the substance container, the essence of the invention consists of the following: A container for taking up and dispensing a substance comprises a tubule, a punch disposed in the tubule so as to slide adjustably, forming a seal, and a sleeve, in which the tubule is accommodated. The punch projects out of one end of the tubule and does not fill the tubule completely, so that a substance chamber remains in the region of the end of the tubule situated within the sleeve.

Due to this special configuration of the substance container, it is suitable for being easily filled with substances of practically any consistency, and reliably protects the substance contained in it from external influences. The substance container consists entirely of simple components, and therefore can be produced in such cost-advantageous manner that it can be disposed of after every use.

The punch can be moved in the tubule, so that the volume of the substance chamber can easily be adjusted.

Advantageously, the sleeve lies relatively tightly around the tubule, wherein it is guaranteed, however, that the tubule remains axially movable in the sleeve.

Advantageously, the punch, the tubule, and the sleeve consist of glass. Glass as a material is accepted in chemical research, in general, as an inert material, and as being resistant to most chemicals. For variants where less breadth with regard to chemical resistance is demanded, however, fundamentally other materials are also possible for the punch, the tubule, and the sleeve. These materials should be so hard, however, that they can also take on the cutting function explained below.

According to an advantageous embodiment the (glass) tubule projects out of the sleeve, and the (glass) tubule and the (glass) sleeve are connected with one another along the edge of the (glass) sleeve at its open end, preferably welded. Particularly advantageously, the (glass) punch and the (glass) tubule are also connected with one another along the edge of the (glass) tubule at its one end, preferably also welded. By means of this reciprocal connection or preferably welding of the three components of the substance container, the substance contained in it is reliably protected against external influences.

According to a further advantageous embodiment, the punch projects out of the sleeve and the punch is connected with the sleeve, preferably welded to it.

According to a further advantageous embodiment, the (glass) tubule is cylindrical and has an inside diameter in the range of 0.05 to 5 mm, preferably 0.1 to 2 mm, particularly preferably 0.1 to 1 mm. With these dimensions, metering amounts from several hundred mg all the way down into the sub-milligram range can be implemented.

Advantageously, the (glass) tubule has a wall thickness in the range of 0.03 to 0.2 mm. Due to these relatively small wall thicknesses, the free edge of the (glass) tubule acts more or less as a blade, and this promotes immersion or better insertion into substances having a firmer consistency. In addition or alternatively, the (glass) tubule has an end configured as a sharp edge or in the manner of a blade.

Expediently, the (glass) sleeve has a wall thickness in the range of 0.03 to 0.2 mm. As will be explained below, the bottom of the sleeve is split off in a method step by means of the (glass) tubule. The wall thickness of the (glass) sleeve must therefore be low enough to allow this splitting off.

Preferably, the punch is configured as a (glass) rod or as a (glass) tube closed on at least one side. This leads to simple producibility of the (glass) punch.

For the purpose of easier and more cost-advantageous producibility, the glass tubules and the glass sleeve are advantageously produced by means of simple one-sided melting of a glass tube.

According to a preferred embodiment, the sleeve is configured in such a manner that it can be broken open by the tubule or the punch, by means of axial application of force by the latter. Advantageously, in this regard, the sleeve has a bottom part that can be split off. The ability of the sleeve to break open or the ability of its bottom part to split off is preferably guaranteed by means of a corresponding thin wall of the sleeve or by means of a planned breaking point.

With regard to the kit for producing a substance container, the essence of the invention consists of the following: A kit for producing a container comprises a tubule, a punch, and a sleeve closed on one side. The punch is coordinated with the tubule in such a manner that it can be introduced into the tubule and can be adjusted by sliding in it, forming a seal, wherein the punch does not fill the tubule completely, so that a substance chamber remains, which has a holding volume that can be adapted by means of adjusting the punch. The sleeve is coordinated with the tubule in such a manner that the tubule can be accommodated in it.

With regard to the method for filling a container, the essence of the invention consists in performing the following steps:
immersing or inserting the tubule provided with the punch into a substance and thereby taking up substance in the substance chamber of the tubule,
positioning the tubule, together with the punch, in the sleeve, and either
connecting the edge of the sleeve, at its open end, with the punch, or
connecting the edge of the sleeve, at its open end, with the tubule, and connecting the edge of the tubule at its end situated outside of the sleeve with the punch.

Preferably, in this regard, the connection between the sleeve and the tubule or the punch and/or the connection between the tubule and the punch is/are produced by welding, preferably by means of a $CO_2$ laser, while the sleeve, with the parts situated in it, is advantageously rotated.

However, it is also possible to use a different method of connection instead of welding, for example plastic sealing or encasing with a synthetic resin.

According to an advantageous embodiment, a metering step takes place after the tubule is immersed or inserted into the substance to be taken up, during which step substance is ejected from the tubule again, by means of the punch, until the remaining substance amount corresponds to a desired target amount. Preferably, in this regard the metering step is carried out with monitoring by a scale. Advantageously, the substance chamber is emptied during this process and substance is taken up once again if the desired target amount has not been reached. Expediently, in this regard, the holding volume of the substance chamber is also adapted by means of the punch.

Advantageously, the substance container can also be closed off under an inert gas atmosphere, in airtight manner.

With regard to the method for emptying a container, the essence of the invention consists in carrying out the following steps:
either
splitting off a bottom part of the sleeve by means of axial impact of force on the tubule while the sleeve is held in place, and
ejecting the substance contained in the substance chamber by means of axial displacement of the punch in the tubule,
or
splitting off a bottom part of the sleeve by means of axial impact of force on the punch, and
ejecting the substance contained in the substance chamber by means of axial displacement of the punch in the tubule,
or
striking the container and thereby splitting off a bottom part of the sleeve, and
ejecting the substance contained in the substance chamber by means of axial displacement of the punch in the tubule.

BRIEF DESCRIPTION OF THE DRAWINGS

In the following, the invention will be described in greater detail using an exemplary embodiment shown in the drawing. The figures show.

DESCRIPTION OF THE INVENTION

Figure 1:
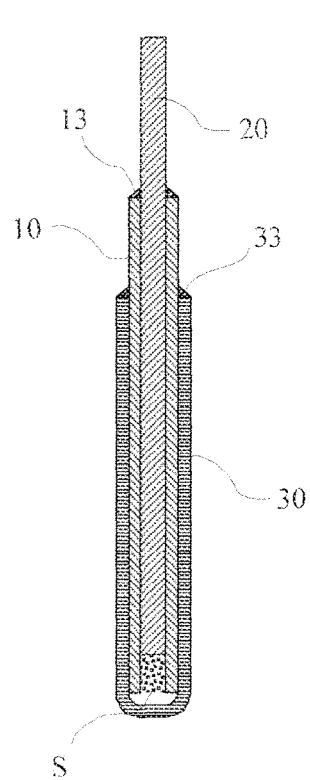
FIG. 1—a sectional representation of an exemplary embodiment of a substance container according to the invention in the filled and completely assembled state, FIG. 2—a sectional representation of the three components of the substance container of FIG. 1, FIG. 3-9—each a schematic representation of the individual phases of filling, assembly, and emptying of the substance container according to the invention, FIG. 10-11—each a schematic representation of the individual phases of emptying the substance container according to the invention by means of an alternative arrangement, FIG. 12—an axial section through a modified tubule of the substance container, and FIG. 13—a sectional representation analogous to FIG. 1 of a further exemplary embodiment of the substance container according to the invention.

The following statement applies to the description below: If reference signs are indicated in a figure for the purpose of clarity of the drawing, but not mentioned in the directly related description part, reference is made to their explanation in preceding or subsequent description parts. Vice versa, in order to avoid overloading the drawing, reference signs that are less relevant for direct understanding are not entered in all the figures. Reference is made to the other figures, in each instance, for this purpose.

The substance container shown in FIG. 1 comprises three components, which preferably all consist of glass. The three components are a glass tubule 10, a glass punch 20, and a glass sleeve 30 that is U-shaped in cross-section, closed off on one side, and has a bottom part 31. Fundamentally, as has already been mentioned, the three components can also consist of a material other than glass. In the following, the invention will be described, purely as an example, only using a glass punch, a glass tubule, and a glass sleeve, without restricting the invention to glass as a material.

The glass tubule 10, the glass punch 20, and the glass sleeve 30 are configured to be cylindrical or in the form of a hollow cylinder, having a circular cross-section. However, they can also have a cross-section that is not circular, but for reasons of production technology, a circular cross-section or a cylindrical form or the form of a hollow cylinder is preferred.

Figure 12:
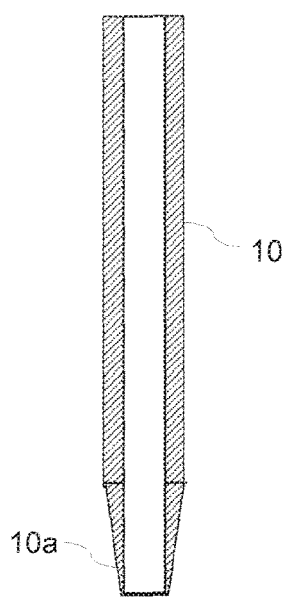

The shape of the tubule 10 imparts great rigidity to it, in spite of its thin walls, and this is of importance for insertion into firm(er) substances or more compact powders. The thin walls are also important for insertion or for scraping substance off a wall part of a storage container. In addition or alternatively, as shown in FIG. 12, an end 10a of the tubule 10 can also be sharpened or configured as a blade. Furthermore, it can also be advantageous to configure the immersion or insertion end of the tubule 10 so as to widen (slightly) toward the outside.

The glass punch 20, which can preferably be configured as a glass rod or alternatively as a glass tube closed at least at one end, is disposed so as to slide in the glass tubule, forming a seal. The glass tubule 10 sits in the glass sleeve 30 and stands on the curved transition between wall and bottom part 31 of the glass sleeve 30. The glass tubule 10 is slightly longer than the glass sleeve 30, so that it projects out of the glass sleeve 30. The glass punch 20 is slightly longer than the glass tubule 10 and projects out of it. The glass punch 20 is disposed in the glass tubule in such a manner that it does not fill the glass tubule 10 completely, but rather a substance chamber 11 remains at its lower end (FIG. 2), wherein the holding volume of the substance chamber can be adapted to the respective requirements by means of axial adjustment of the glass punch 20.

In the filled state of the substance container (FIG. 1), the lower end of the glass tubule 10 or the substance chamber 11 takes up a substance S. The glass tubule 10 and the glass sleeve 30 are connected with one another along the upper edge 32 of the glass sleeve 10, preferably welded. The connection location or weld seam is indicated as 33. Analogously, the glass punch 20 and the glass tubule 10 are connected with one another along the upper edge 12 of the glass tubule, preferably welded, with the connection location or weld seam being indicated as 13. The two connection locations or weld seams 13 and 33 have only relatively slight stability, so that they can simply be broken open by an impact of axial force, without destroying the glass tubule 10 and the glass punch 20 and the glass sleeve 30 as this happens.

The length $L_R$ of the glass tubule 10 amounts to about 70 mm, for example; the slightly greater length Ls of the glass punch 20 amounts to about 80 mm, for example. The inside diameter $D_R$ of the glass tubule 10 lies in the range of 0.05 to 5 mm, preferably 0.1 to 2 mm, very particularly preferably in the range of 0.1 to 1 mm. The wall thickness $W_R$ of the glass tubule 10 preferably amounts to 0.03 to 0.2 mm. The outside cross-section of the glass punch 20 is adapted to the inside cross-section of the glass tubule 10, with precise fit, with the outside diameter $D_R$ of the glass punch 20 preferably being less by only 0.01-0.02 mm than the inside diameter $D_R$ of the glass tubule 10. In the case of a slightly flexible material, the punch 20 can also have a very slightly greater diameter than the inside diameter of the tubule. The wall thickness $W_H$ of the glass sleeve 30 preferably amounts to 0.03 to 0.2 mm.

Figure 2:
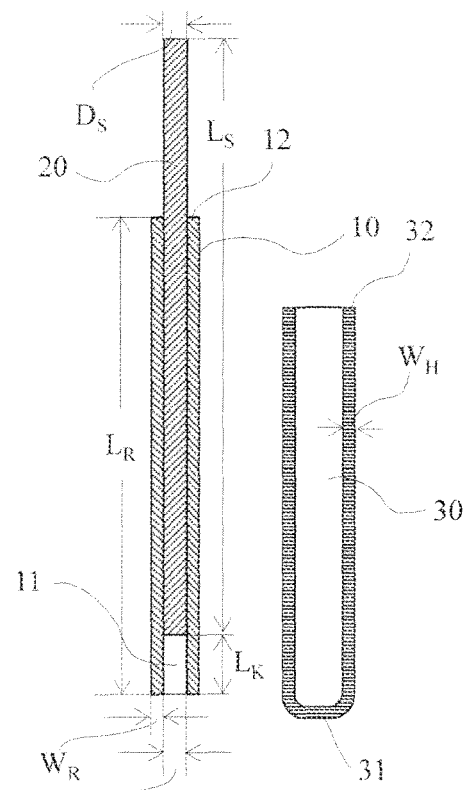

The volume of the substance chamber 11 of the glass tubule 10 is dimensioned in such a manner that the substance chamber 11 can accommodate a substance amount from a few hundred mg all the way down into the sub-milligram range, depending on the inside diameter $D_R$ of the glass tubule 10 and on the specific gravity of the substance S to be accommodated. The volume of the substance chamber 11 is defined by the inside diameter $D_R$ and by the length $L_K$ of the substance chamber 11 (which is adjustable by means of corresponding positioning of the glass punch 20) (FIG. 2).

In the following, it will be explained, using FIGS. 3-9, how the substance container according to the invention is filled, assembled, and emptied again.

Figure 3:
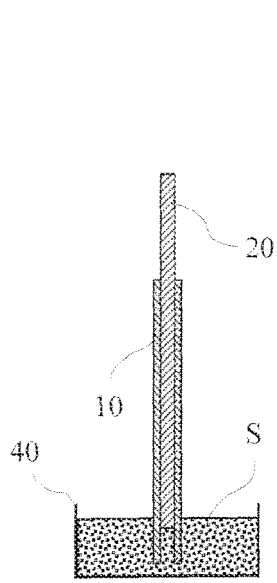

First, the glass tubule 10, with the glass punch 20 situated in it, is immersed, with its lower end, which forms the substance chamber 11, into the substance S to be taken up, which is kept on hand in a storage container 40 (FIG. 3). Depending on the consistency of the substance S, immersion can also be understood to be insertion, in this regard. The immersion or insertion of the glass tubule can take place manually or by means of a metering robot, for example. By means of the immersion or insertion of the glass tubule 10 into the substance S, the substance penetrates into the substance chamber 11 of the glass tubule 10 and is held in place there by means of adhesion forces and/or capillary forces, depending on the consistency.

Figure 4:
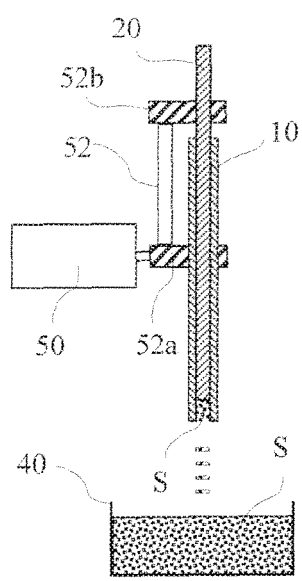

Thereupon the glass tubule 10, together with the glass punch 20, is raised above the storage container 40. In an optional metering step, as much substance is now ejected from the glass tubule 10 by means of the glass punch 20 (if applicable in multiple steps) until the substance amount remaining in the substance chamber corresponds to a desired target amount. The entire substance taken up can also be ejected, and substance can be taken up again using a substance chamber 11 that has been adapted by adjusting the length $L_K$. These steps advantageously take place with monitoring by a scale 50, to which the glass tubule 10 is attached by means of a first gripping arm 52a of a gripping device 52 (FIG. 4). The gripping device 52 possesses a second gripping arm 52b, which holds the glass punch 20 in place. Particularly for taking up substance, it is important to also fix the glass punch in place, so that first of all, the punch does not lie on the substance after it has been taken up, and thereby triggers a pulse, for example, by means of impacts, which pulse could dispense the substance prematurely or unintentionally. Second of all, the glass punch is held in place so that the substance chamber can be adjusted.

If, for example, the system is ordered to take up 15 mg of substance, and then effectively 22 mg are taken up (as measured by the scale), the substance is discharged again, if necessary, and the substance chamber is adjusted accordingly, by means of adjusting the punch—taking into consideration that a small amount of the substance might remain adhering to the apparatus (this can also be calibrated).

Figure 5:
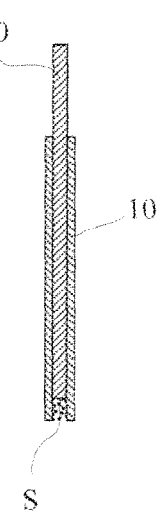

After these steps, the glass tubule 10 contains the desired substance amount S (FIG. 5).

Figure 6:
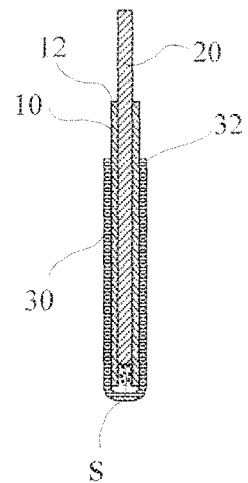

In the next step, the glass tubule 10, filled with the substance S, together with the glass punch 20, is introduced into the glass sleeve 30 (FIG. 6).

Figure 7:
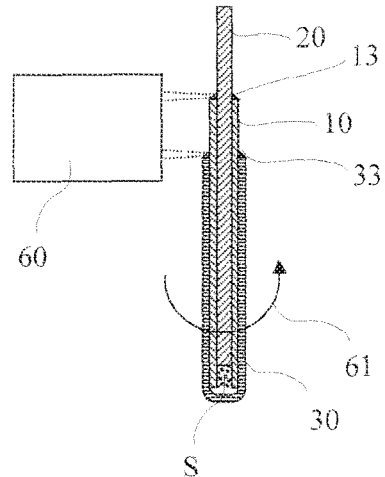

Subsequently, the glass tubule 10 and the glass sleeve 30, on the one hand, and the glass tubule 10 and the glass punch 20, on the other hand, are welded to one another along their edges 12 and 32, with two circumferential weld seams 13 and 33 being formed (FIG. 7). Welding can preferably take place by means of a laser welding device 60, with the glass sleeve 30, together with the glass tubule 10 and the glass punch 20, being rotated about their axes. The rotational movement is symbolized by an arrow 61 in FIG. 7.

After welding or sealing of the container, the latter is ready for transport, and the substance contained in it is enclosed in airtight manner and protected.

Figure 8:
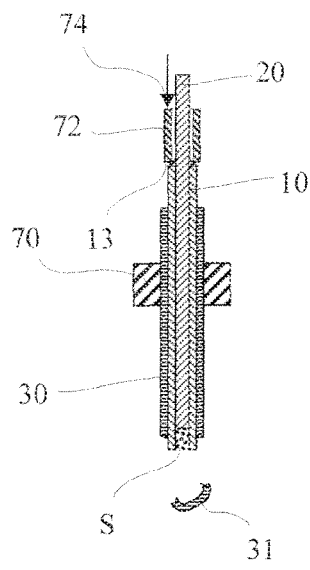

To remove the substance S contained in the container at the place of use, first the glass sleeve 30 is opened (FIG. 8). This preferably takes place by means of short, sudden impact of axial force on the upper edge of the glass tubule 10 or on the weld seam 13, with the glass sleeve 30 being held in place by means of a suitable gripping device 70. The impact of force can take place, for example, by way of a sleeve 72 that has been pushed onto the glass punch 20 and sits on the weld seam 13 or on the edge of the glass tubule 10, to which an axial force symbolized by an arrow 74 is applied. By means of the sudden action of force, the weld seam 33 between glass tubule 10 and glass sleeve 30 is broken open, and the glass tubule 10 is moved slightly relative to the glass sleeve 30. This in turn brings about the result that the bottom part 31 of the glass sleeve 30 is split off.

Figure 10:
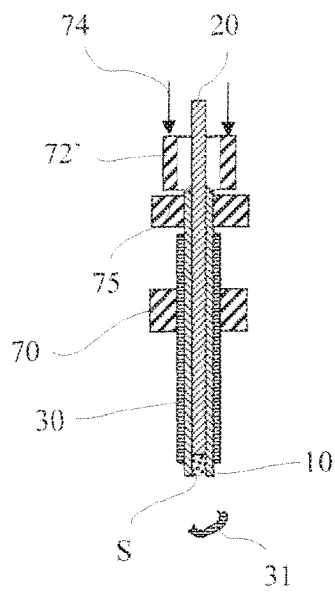

FIG. 10 illustrates an alternative arrangement for opening the glass sleeve 30. Here, the glass sleeve 30 is held in place by means of the gripping device 70, and, at the same time, the glass tubule 10 is held in place by means of a further gripping device 75. Opening the glass sleeve 30 takes place by means of a short, sudden impact of axial force on the glass tubule 10. The action of force takes place by way of a sleeve 72' that has been pushed onto the glass punch 20 and sits on the gripping device 75, to which an axial force symbolized by the arrow 74 is applied. Alternatively, the two gripping devices 70 and 75 can be moved relative to one another (or the one gripping device can be held in place and the other gripping device can be moved up or down over a short distance, in pulse-like manner). By means of the sudden impact of force, the weld seam 33 between glass tubule 10 and glass sleeve 30 is broken open, and the glass tubule 10 is moved slightly relative to the glass sleeve 30. This in turn brings about the result that the bottom part 31 of the glass sleeve 30 is split off.

Figure 9:
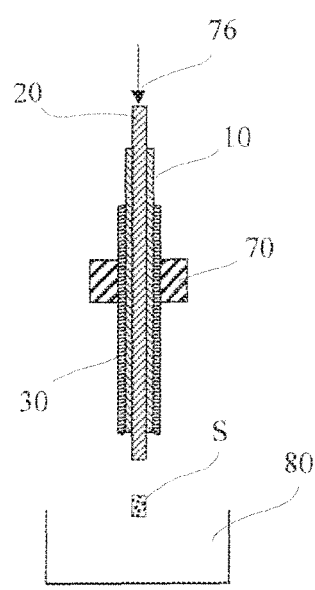
Figure 11:
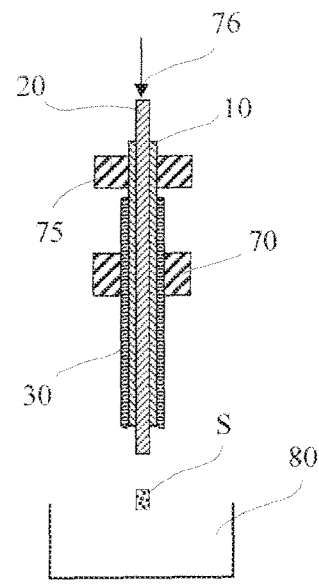

If this has not happened yet, the container is now positioned over a receptacle 80 (FIGS. 9 and 11). Then the glass punch 20 is impacted with an axial force symbolized by an arrow 76, with the container being held stationary at its glass sleeve 30, by means of the gripping device 70. If the pressure of the gripping device is not transferred directly to the glass tubule 10 by means of flexible yielding of the thin wall of the glass sleeve 30, the tubule is also held stationary by means of the further gripping device 75 (FIG. 11). By means of the application of force, first the weld seam 13 between the glass tubule 10 and the glass punch 20 is broken open, and then the glass punch 20 is displaced downward relative to the glass tubule 10, causing the substance S contained in the substance chamber of the glass tubule 10 to be ejected from the glass tubule 10 and to drop into the receptacle 80.

Finally, the substance container is discarded.

Figure 13:
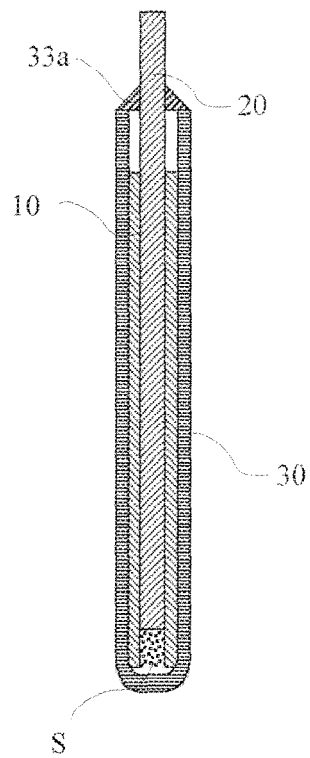

In FIG. 13, a modified embodiment of the substance container according to the invention is shown. The difference from the embodiment according to FIG. 1 consists in that here, the sleeve 30 is not connected with or welded to the tubule 10, but rather connected with or welded to the punch 20. The connection seam or weld seam is indicated as 33a.

While filling and assembly of the substance container can essentially take place in the same way as in the exemplary embodiment according to FIG. 1, breaking open and emptying the substance container requires a somewhat different method of procedure.

For this purpose, first the punch 20 with the substance S is pressed downward, causing the weld seam 33a to be broken open, on the one hand, and then the bottom of the sleeve 30 to be broken. Alternatively, the substance container can be pounded into the receptacle and thereby the bottom of the sleeve 30 can be broken up. The sleeve 30 can have a slightly thicker wall thickness, as long as only the bottom part is configured to be correspondingly thin or that a planned breaking point is provided, so that the sleeve can easily be broken open.

The substance container according to the invention is suitable for accommodating the most varied substances, from powder, liquid, oily, sticky, viscous, wax-like to chocolate-like, vegetable-like or fruit-like, etc. Advantageously, all the components of the container consist of glass and can be produced in simple and cost-advantageous manner. The glass tubule of the container, together with the glass punch disposed in it, can also be used directly as a metering tool in a metering apparatus. For transport of the substance, the substance then does not first have to be filled into a separate transport vessel, but rather can be transported directly in the metering tool—after the container is completed by affixing the glass sleeve and reciprocally welding its three components. Filling the container is possible from practically any common storage vessel, without any type of adapter, as long as the substance container has the required length and a correspondingly smaller diameter than the storage container. Vice versa, emptying the container into any common receptacle is also possible. The substance container according to the invention is specifically suitable for substance amounts of a few hundred mg, and, above all, all the way down into the sub-milligram range. By means of reciprocally connecting, preferably welding or sealing its three components, the substance situated in the container is optimally protected from external influences, above all if filling the substance or also welding the substance container is carried out under a chemically inert gas such as nitrogen or, even more preferably, argon, in advantageous manner.

The invention claimed is:

1. A container for taking up and dispensing a substance, comprising a tubule, a punch disposed in the tubule so as to slide adjustably, forming a seal, and a sleeve closed on one side, in which the tubule is accommodated, wherein the punch projects out of one end of the tubule, and wherein the punch does not fill the tubule completely, so that a substance chamber remains in a region of an other end of the tubule, which end is situated within the sleeve, wherein said substance chamber has a holding volume configured to be adapted by means of adjusting the punch.

2. The container according to claim 1, wherein the tubule projects out of the sleeve and that the tubule and the sleeve are connected with one another along an edge of the sleeve at its open end.

3. The container according to claim 1, wherein the punch and the tubule are connected with one another along an edge of the tubule, at its one end.

4. The container according to claim 1, wherein the punch projects out of the sleeve and that the punch is connected with the sleeve.

5. The container according to claim 1, wherein the tubule is configured to be cylindrical and has an inside diameter in the range of 0.05 to 5 mm.

6. The container according to claim 1, wherein the tubule has a wall thickness in the range of 0.03 to 0.2 mm.

7. The container according to claim 1, wherein the tubule is configured to have a sharp edge or configured in the manner of a blade at one end.

8. The container according to claim 1, wherein the sleeve has a wall thickness in the range of 0.03 to 0.2 mm.

9. The container according to claim 1, wherein the punch is configured as a rod or as a tube closed on at least one side.

10. The container according to claim 1, wherein the sleeve is configured in such a manner that it can be broken open by the tubule or the punch, by means of applying axial force with these parts.

11. The container according to claim 1, wherein the sleeve has a bottom part that can be split off.

12. The container according to claim 1, wherein the tubule, the punch, and the sleeve consist of glass.

13. A kit for producing a container according to claim 1, comprising a tubule, a punch, and a sleeve closed on one side, wherein the punch is coordinated with the tubule in such a manner that the punch is configured to be introduced into the tubule and adjusted to slide in it, forming a seal, wherein the punch does not fill the tubule completely, so that a substance chamber remains, which has a holding volume configured to be adapted by adjusting the punch, and wherein the sleeve is coordinated with the tubule in such a manner that the tubule is configured to be accommodated in it.

14. A method for filling a container according to claim 1, comprising the following steps:
   immersing or inserting the tubule provided with the punch into a substance and thereby taking up substance into the substance chamber of the tubule,
   positioning the tubule, together with the punch, in the sleeve, and either
   connecting an edge of the sleeve, at its open end, with the punch, or
   connecting the edge of the sleeve, at its open end, with the tubule, and connecting an edge of the tubule at its end situated outside of the sleeve with the punch.

15. The method according to claim 14, wherein the connection between the sleeve and the tubule or the punch and/or the connection between the tubule and the punch is/are produced by welding.

16. The method according to claim 14, wherein after immersing or inserting the tubule into the substance to be taken up, a metering step takes place, during which step substance is ejected from the tubule by means of the punch until the remaining substance amount corresponds to a desired target amount.

17. The method according to claim 16, wherein the metering step is carried out with monitoring by a scale.

18. The method according to claim 17, wherein if the desired target amount was not reached, the substance chamber is emptied and substance is taken up once again.

19. The method according to claim 18, wherein the holding volume of the substance chamber is adapted by means of the punch.

20. The method according to claim 14, wherein the substance container is sealed in airtight manner under an inert gas atmosphere.

21. A method for emptying a container according to claim 1, comprising the following steps:
   either
   splitting off a bottom part of the sleeve by means of the action of axial force on the tubule while the sleeve is held in place, and
   ejecting the substance contained in the substance chamber by means of axial displacement of the punch in the tubule,
   or
   splitting off a bottom part of the sleeve by means of the action of axial force on the punch, and
   ejecting the substance contained in the substance chamber by means of axial displacement of the punch in the tubule,
   or
   striking the container and thereby splitting off a bottom part of the sleeve, and
   ejecting the substance contained in the substance chamber by means of axial displacement of the punch in the tubule.

* * * * *